(12) United States Patent
Ji et al.

(10) Patent No.: US 9,444,107 B2
(45) Date of Patent: Sep. 13, 2016

(54) PREPARATION OF NANOSTRUCTURED THIN CATALYTIC LAYER-BASED ELECTRODE INK

(71) Applicant: GM Global Technology Operations LLC, Detroit, MI (US)

(72) Inventors: Chunxin Ji, Penfield, NY (US);
Sumeet Bhargava, Superior, CO (US);
Matthew Dioguardi, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 566 days.

(21) Appl. No.: 13/905,651

(22) Filed: May 30, 2013

(65) Prior Publication Data
US 2013/0260278 A1   Oct. 3, 2013

Related U.S. Application Data (60) Division of application No. 12/701,095, filed on Feb. 5, 2010, now Pat. No. 8,481,231, which is a continuation-in-part of application No. 12/465,913, filed on May 14, 2009, now Pat. No. 8,802,329.

(51) Int. Cl.
*H01M 4/90* (2006.01)
*H01M 4/88* (2006.01)
*H01M 8/10* (2016.01)

(52) U.S. Cl.
CPC .......... *H01M 4/9075* (2013.01); *H01M 4/881* (2013.01); *H01M 4/8807* (2013.01); *H01M 4/8814* (2013.01); *H01M 4/8828* (2013.01);

(Continued)

(58) Field of Classification Search
None
See application file for complete search history.

(56) References Cited

U.S. PATENT DOCUMENTS

| 4,812,352 A | 3/1989 | Debe |
|---|---|---|
| 4,940,854 A | 7/1990 | Debe |

(Continued)

FOREIGN PATENT DOCUMENTS

| CN | 1433358 A | 7/2003 |
|---|---|---|
| CN | 1471186 A | 1/2004 |

(Continued)

OTHER PUBLICATIONS

Chia-Liang Sun et al., Ultrafine Platinum Nanoparticles Uniformly Dispersed on Arrayed CNx Nanotubes With High Electrochemical Activity, 2005 American Chemical Society, vol. 17, pp. 3749-3753, USA.

(Continued)

*Primary Examiner* — Melvin C Mayes
*Assistant Examiner* — Michael Forrest
(74) *Attorney, Agent, or Firm* — Quinn Law Group, PLLC (57) ABSTRACT

A method of making an electrode ink containing nanostructured catalyst elements is described. The method comprises providing an electrocatalyst decal comprising a carrying substrate having a nanostructured thin catalytic layer thereon, the nanostructure thin catalytic layer comprising nanostructured catalyst elements; providing a transfer substrate with an adhesive thereon; transferring the nanostructured thin catalytic layer from the carrying substrate to the transfer substrate; removing the nanostructured catalyst elements from the transfer substrate; providing an electrode ink solvent; and dispersing the nanostructured catalyst elements in the electrode ink solvent. Electrode inks, coated substrates, and membrane electrode assemblies made from the method are also described.

19 Claims, 11 Drawing Sheets

(52) U.S. Cl.
CPC ............ *H01M 4/90* (2013.01); *H01M 8/1004* (2013.01); *H01M 2008/1095* (2013.01); *Y02E 60/50* (2013.01); *Y02E 60/522* (2013.01)

(56) References Cited

U.S. PATENT DOCUMENTS

| | | |
|---|---|---|
| 5,039,561 A | 8/1991 | Debe |
| 5,175,030 A | 12/1992 | Lu et al. |
| 5,238,729 A | 8/1993 | Debe |
| 5,273,615 A | 12/1993 | Asetta et al. |
| 5,336,558 A | 8/1994 | Debe |
| 5,338,430 A | 8/1994 | Parsonage et al. |
| 5,674,592 A | 10/1997 | Clark et al. |
| 5,879,827 A | 3/1999 | Debe et al. |
| 5,879,828 A | 3/1999 | Debe et al. |
| 6,238,534 B1 | 5/2001 | Mao et al. |
| 6,482,763 B2 | 11/2002 | Haugen et al. |
| 6,521,324 B1 | 2/2003 | Debe et al. |
| 6,524,736 B1 | 2/2003 | Sompalli et al. |
| 6,669,801 B2 | 12/2003 | Yoshimura et al. |
| 6,770,337 B2 | 8/2004 | Debe et al. |
| 7,041,373 B2 | 5/2006 | Mukasa et al. |
| 7,419,741 B2 | 9/2008 | Vernstrom et al. |
| 2003/0022403 A1 | 1/2003 | Shimoda et al. |
| 2005/0067345 A1 | 3/2005 | Prugh et al. |
| 2005/0095494 A1 | 5/2005 | Fuss et al. |
| 2005/0233198 A1 | 10/2005 | Nuzzo et al. |
| 2006/0204831 A1 | 9/2006 | Yan et al. |
| 2007/0059452 A1 | 3/2007 | Debe et al. |
| 2007/0059573 A1 | 3/2007 | Debe et al. |
| 2007/0082256 A1 | 4/2007 | Debe et al. |
| 2007/0082814 A1 | 4/2007 | Debe et al. |
| 2007/0199649 A1 | 8/2007 | Sompalli et al. |
| 2008/0020253 A1 | 1/2008 | Neubert et al. |
| 2008/0020261 A1 | 1/2008 | Hendricks et al. |
| 2008/0020923 A1 | 1/2008 | Debe et al. |
| 2008/0128074 A1 | 6/2008 | Mah et al. |
| 2008/0143061 A1 | 6/2008 | Steinbach et al. |
| 2008/0145712 A1 | 6/2008 | Pierpont et al. |
| 2008/0182150 A1 | 7/2008 | De Haan et al. |

FOREIGN PATENT DOCUMENTS

| | | |
|---|---|---|
| CN | 1560949 A | 1/2005 |
| CN | 101263619 A | 9/2008 |
| EP | 1 381 102 A2 | 1/2004 |
| WO | 2007032903 A2 | 3/2007 |

OTHER PUBLICATIONS

Scott C. Warren et al., Ordered Mesoporous Materials from Metal Nanoparticle-Block Copolymer Self-Assembly, www.sciencemag.org, vol. 320, Jun. 27, 2008, pp. 1748-1752, USA.

Mark K. Debe et al., Advanced MEAs for Enhanced Operating Conditions, FY 2005 Progress Report, DOE Hydrogen Program, pp. 730-738.

T. Hatanaka et al., PEFC Electrodes Based on Vertically Oriented Carbon Nanotubes, Toyota Motor Corporation, 210th ECS Meeting, Abstract #549, copyright ECS, Oct. 2006, 1 page.

Mark K. Debe, Advanced MEAs for Enhanced Operating Conditions, Amendable toHigh Volume Manufacture, 3M/DOE Cooperative Agreement No. DE-FC36-02AL67621, Fuel Components Program, 3M Company, May 24, 2004, pp. 1-27.

Mark K. Debe, NanoStructured Thin Film Catalysts (NSTFC) for Next Generation PEM Fuel Cells, Fuel Cell Components Program, Northern Nano Workshop, Nov. 9, 2006, University of Minnesota, pp. 1-38.

Non-Final Office Action dated Oct. 13, 2011 pertaining to U.S. Appl. No. 12/465,913, filed May 14, 2009.

Non-Final Office Action dated Apr. 13, 2012 pertaining to U.S. Appl. No. 12/465,913, filed May 14, 2009.

Non-Final Office Action dated Jun. 22, 2012 pertaining to U.S. Appl. No. 12/788,915, filed May 27, 2010.

Non-Final Office Action dated Nov. 19, 2012 pertaining to U.S. Appl. No. 12/718,306, filed Mar. 5, 2010.

Non-Final Office Action dated Nov. 26, 2012 pertaining to U.S. Appl. No. 12/718,330, filed Mar. 2, 2010.

Non-Final Office Action dated Feb. 1, 2013 pertaining to U.S. Appl. No. 12/701,095, filed Feb. 5, 2010.

PREPARATION OF NANOSTRUCTURED THIN CATALYTIC LAYER-BASED ELECTRODE INK

STATEMENT OF RELATED CASES

This application is a Divisional of U.S. application Ser. No. 12/701,095 filed Feb. 5, 2010 now U.S. Pat No. 8,481,231 which is a Continuation-In-Part of U.S. application Ser. No. 12/465,913 filed May 14, 2009, now U.S. Pat. No. 8,802,329 entitled ELECTRODE CONTAINING NANOSTRUCTURED THIN CATALYTIC LAYERS AND METHOD OF MAKING, which is incorporated herein by reference.

This application is related to U.S. application Ser. No. 12/718,306, filed Mar. 5, 2010, entitled FABRICATION OF CATALYST COATED DIFFUSION MEDIA LAYERS CONTAINING NANOSTRUCTURED THIN CATALYTIC LAYERS; and U.S. application Ser. No. 12/718,330, filed Mar. 5, 2010, entitled FABRICATION OF ELECTRODES WITH MULTIPLE NANOSTRUCTURED THIN CATALYTIC LAYERS, which are incorporated herein by reference.

FIELD OF THE INVENTION

The present invention relates generally to electrodes for fuel cells, and specifically to nanostructured thin catalytic layer-based electrode ink, and to methods of making such electrode inks.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers, and a cathode plate and an anode plate are placed outside the gas diffusion media layers. The components are compressed to form the fuel cell.

The currently widely used fuel cell electrocatalysts are platinum nanoparticles supported on carbon supports. Depending on the catalysts and loading, the electrodes prepared with carbon supported platinum catalysts normally have thickness from several microns to about 10 or 20 microns with porosities varying from 30% to 80%. One of the disadvantages of these carbon supported catalysts is the poor corrosion resistance of carbon under certain fuel cell operating conditions, which results in fast performance degradation.

The catalyst layers can be made of nanostructured thin support materials. The nanostructured thin support materials have particles or thin films of catalyst on them. The nanostructure thin catalytic layers can be made using well known methods. One example of a method for making nanostructured thin catalytic layers is described in U.S. Pat. Nos. 4,812,352. 4,940,854, 5,039,561, 5,175,030, 5,238,729, 5,336,558, 5,338,430, 5,674,592, 5,879,827, 5,879,828, 6,482,763, 6,770,337, and 7,419,741, and U.S. Publication Nos. 2007/0059452, 2007/0059573, 2007/0082256, 2007/0082814, 2008/0020261, 2008/0020923, 2008/0143061, and 2008/0145712, which are incorporated herein by reference. The basic process involves depositing a material on a substrate, such as polyimide, and annealing the deposited material to form a layer of nanostructured support elements, known as whiskers. One example of a material which can be used to form the nanostructured support elements is "perylene red" (N,N'-di(3,5-xylyl)perylene-3,4,9,10 bis(dicarboximide) (commercially available under the trade designation "C. I. PIGMENT RED 149" from American Hoechst Corp. of Somerset, N.J.)). A catalyst material is then deposited on the surface of nanostructured support elements to form a nanostructured thin film (NSTF) catalyst layer, which is available from 3M.

The nanostructured thin catalytic layers can be transferred directly to a proton exchange membrane, such as a DuPont Nafion® membrane, using a hot press lamination process, for example. The polyimide substrate is then peeled off, leaving the layer of whiskers attached to the membrane.

These types of nanostructured thin catalytic layers have demonstrated high catalytic activity, which is helpful to reduce the platinum utilization in fuel cell stacks. Most importantly, because the supporting layer is not made of carbon as in the traditional platinum catalysts for fuel cell application, the nanostructured thin catalytic layers are more resistant to corrosion under certain fuel cell operating conditions, and thus improve the fuel cell's durability.

However, after the annealing process is completed, a thin layer of residual non-crystallized perylene red remains at the surface of the polyimide substrate. Therefore, when the whiskers have been transferred to the PEM and the polyimide substrate peeled off, the surface of the whiskers that was adjacent to the polyimide substrate is exposed and becomes the surface of membrane electrode assembly (MEA). Consequently, the residual non-crystallized perylene red backing, which originally was adjacent to the polyimide substrate, is exposed. This can be detrimental to the fuel cell operation because it can block water and gas transfer in and out of the electrode.

In addition, an MEA made with this type of whisker catalyst layer has a narrow range of operating conditions (i.e., it cannot be too dry or too wet) to provide good performance. If the fuel cell is operated under wet conditions, the thin layer of whiskers, which is less than 1 µm thick, cannot provide enough storage capacity for the product water, resulting in flooding. Under dry conditions, it is believed that not all portions of the whiskers are utilized to catalyze the reaction due to poor proton transfer characteristics.

Besides the NSTF whisker catalyst described above, there are other uniformly dispersed (or dispersed with a desired pattern) catalytic nanostructured materials prepared on a substrate. For example, aligned carbon nanotubes, aligned carbon nanofibers, or nanoparticles, and the like could be grown on silicon or other substrates. Catalytic materials are then deposited onto the nanostructured materials. Electrocatalyst decals incorporating such materials are described, for example, in Hatanaka et al., PEFC Electrodes Based on Vertically Oriented Carbon Nanotubes, 210$^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Therefore, there is a need for processing and constructing an electrode containing catalyst materials which can provide good performance.

SUMMARY OF THE INVENTION

This invention provides a method of harvesting a nanostructured thin catalyst from its carrying substrate and incorporating it into an ink for further electrode fabrication. Nanostructured thin catalytic layers are transferred from a carrying substrate to a transfer substrate coated with an adhesive. The nanostructured catalyst elements are removed from the transfer substrate by dissolving the adhesive and dispersed in the electrode ink. The electrode ink can be coated onto a substrate including, but not limited to, an electrode decal, a proton exchange membrane, or diffusion media. These coated structures can then be used in MEAs.

One aspect involves a method of making an electrode ink containing nanostructured catalyst elements. The method comprises providing an electrocatalyst decal comprising a carrying substrate having a nanostructured thin catalytic layer thereon, the nanostructure thin catalytic layer comprising nanostructured catalyst elements; providing a transfer substrate with an adhesive thereon; transferring the nanostructured thin catalytic layer from the carrying substrate to the transfer substrate; removing the nanostructured catalyst elements from the transfer substrate; providing an electrode ink solvent; and dispersing the nanostructured catalyst elements in the electrode ink solvent.

Another aspect involves an electrode ink and methods to disperse nanostructured catalyst elements in the electrode ink. The electrode ink comprises a solvent, and nanostructured catalyst elements and optionally other particles dispersed in the electrode ink solvent, the nanostructured catalyst elements obtained from a nanotstructured thin catalytic layer transferred from a carrying substrate to a transfer substrate.

Another aspect involves a coated substrate. The coated substrate comprises a substrate selected from an electrode decal, a proton exchange membrane, or a diffusion media; an electrode ink coated on the substrate, the electrode ink comprising nanostructured catalyst elements dispersed in an electrode ink solvent, the nanostructured catalyst elements obtained from a nanostructured thin catalytic layer transferred from a carrying substrate to a transfer substrate, and optionally, at least one additional material selected from ionomer; conductive particles, such as carbon powder, carbon fibers; catalyst; titanium dioxide; silica; nanofibers; or nanotubes.

Another aspect relates to a membrane electrode assembly. The membrane electrode assembly comprises: a proton exchange membrane having first and second sides; a pair of gas diffusion media on opposite sides of the proton exchange membrane, the gas diffusion media having first and second sides, the first side facing the proton exchange member; and a pair of electrode layers between the proton exchange membrane and the pair of gas diffusion media, at least one of the electrode layers formed by coating an electrode ink on the proton exchange membrane, or the first side of the pair of gas diffusion media, the electrode ink comprising nanostructured catalyst elements dispersed in an electrode ink solvent, the nanostructured catalyst elements obtained from a nanostructured thin catalytic layer transferred from a carrying substrate to a transfer substrate, and optionally, at least one additional material selected from ionomer; conductive particles, such as carbon powder, carbon fibers; catalyst; titanium dioxide; silica; nanofibers; or nanotubes.

Other features and advantages of the present invention will be apparent in light of the description of the invention embodied herein.

BRIEF DESCRIPTION OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which.

DETAILED DESCRIPTION

This invention provides a method for making an electrode ink containing nanostructured catalyst elements from nanostructured thin catalytic layers.

The nanostructured thin catalytic layers are transferred from a carrying substrate to a transfer substrate. They are removed from the transfer substrate and then dispersed into an electrode ink.

The nanostructured catalyst elements can be cleaned either before or after removal from the transfer substrate. Cleaning can involve removing the adhesive and/or residual layer with appropriate solvents, or by centrifuging and sonicating the catalyst elements, filtration or drying and redispersing.

Additional materials can be incorporated into the electrode ink as desired (e.g., to increase the water storage capacity, to improve fuel cell performance under dry or wet conditions, or to increase conductivity). The nanostructured catalyst elements can be dispersed separately before adding into electrode ink or dispersed simultaneously with other materials in the electrode ink.

The nanostructured thin catalytic layer is transferred from the carrying substrate to a transfer substrate coated with an adhesive. The transfer substrate can be porous or nonporous, as desired.

If the transfer substrate is porous, the nanostructured thin catalytic layer can then be further processed on the porous transfer substrate, if desired. The adhesive can be removed, and any residual material (e.g., non-crystallized perylene red used to make whiskers, or catalysts used to make carbon nanotubes, and the like) can also be removed. These processes are described in U.S. application Ser. No. 12/465,913 filed May 14, 2009, entitled Electrode Containing Nanostructured Thin Catalytic Layers And Method Of Making; U.S. application Ser. No. 12/718,306, filed Mar. 5, 2010, entitled Fabrication Of Catalyst Coated Diffusion Media Layers Containing Nanostructured Thin Catalytic Layers; and U.S. application Ser. No. 12/718,330 filed Mar. 5, 2010, entitled Fabrication Of Electrodes With Multiple Nanostructured Thin Catalytic Layers, each of which is incorporated herein by reference. Alternatively, the nanostructured catalyst elements can be removed from the transfer substrate first and then further processed, if desired.

If a nonporous transfer substrate is used, the nanostructured catalyst elements can be removed from the transfer substrate and then further processed to remove the adhesive and/or residual layer.

The nanostructured catalyst elements are then dispersed in the electrode ink. There are several ways to disperse the nanostructured catalyst elements. One approach would be to separate nanostructured catalyst elements from the transfer substrate by dissolving the adhesive, followed by cleaning the catalyst elements by one or more of centrifuging, filtration, sonication, drying and redispersing, etc. After the cleansing step, the nanostructured catalyst elements would be dispersed in the electrode ink solvent, along with the various optional ink components, including, but not limited to, ionomer, carbon and other particles, and blended together using techniques such as ball milling, media milling, stifling, planetary milling, etc. Suitable electrode ink solvents include, but are not limited to, water, isopropyl alcohol (IPA), ethanol, water/IPA, water/ethanol, and the like. The electrode ink would then be coated on the PEM or gas diffusion media to form the electrode assembly.

Another approach would be to predisperse the nanostructured catalyst elements in a solvent using one of the methods discussed above. Suitable solvents are listed above. The other components, such as the carbon or conventional Pt/C catalyst powder, would also be separately predispersed in an electrode solvent, which could be the same as that for the nanostructured catalyst elements or different. The two dispersions would then be blended together to form the electrode ink. The advantage of this method is that different dispersing methods can be used for the two inks, and each ink can be controlled and characterized separately in terms of solvent selection, ink rheology, and particle size distribution before they are blended together to form the final ink. This can yield potential improvement in electrode coating quality and improve performance and durability of the final electrode.

An electrode ink typically contains ionomer, organic solvents such as isopropyl alcohol, ethanol, etc. and electrocatalyst. The various ingredients are combined in predefined concentrations or predispersed separately as discussed above and subsequently milled/blended together using tools such as ball milling, sonication, etc.

Additional materials can be incorporated into the electrode ink to increase the electrode performance robustness. Ionic conducting components can be incorporated into the electrode ink, if desired. Hydrophobic particles, for example, PTFE, can be incorporated into the electrode ink to improve the electrode water management capability, if desired. Graphitized or amorphous carbon powder or fiber, other durable particles, or other electrocatalysts like Pt supported on carbon can also be incorporated into the electrode ink to increase the electrode water storage capacity, if desired. An electrode prepared with such an electrode ink provides good performance over a wider range of operating conditions, and takes advantage of nanostructured catalyst elements' high catalytic activity and resistance to corrosion under certain fuel cell operating conditions The nanostructured thin catalytic layer is transferred from the carrying substrate to a transfer substrate. The carrying substrate can be the substrate the nanostructured thin catalytic layer was grown on or carried on. The transfer substrate that the nanostructured thin catalytic layer will be transferred to is pre-coated with a thin layer of temporary adhesive. In doing so, the catalyst loading ($mg/cm^2$) on the transfer substrate is essentially the same as the carrying substrate where the nanostructured thin catalytic layer was formed.

Because of the transfer of the nanostructured thin catalytic layer from the carrying substrate to the transfer substrate, the nanostructured thin catalytic layer is inverted on the transfer substrate compared to the carrying substrate. In other words, after the transfer, the surface of the nanostructured thin catalytic layer that was exposed on the carrying substrate is adjacent to the transfer substrate, while the surface that was adjacent to the carrying substrate is exposed. The surface that was adjacent to the carrying substrate can contain residual materials that were used to form the nanostructured catalyst elements (e.g., residual non-crystallized perylene red, or catalysts that were used to grow carbon nanofibers or carbon nanotubes, and the like), which can be cleaned through later treatment.

By adjacent, we mean next to, but not necessarily directly next to. There can be one or more intervening layers, as discussed below.

The residual layer is typically the left over materials used to form the nanostructured catalyst support elements. For example, when the nanostructured thin catalytic layer is a layer of whiskers made from perylene red, the residual layer is non-crystallized perylene red. For other nanostructured thin catalytic layers, the residual layer would be different. For example, it might be Fe or Ni catalysts used to grow carbon nanofibers or carbon nanotubes.

To simplify the discussion in the following illustrations, a nanostructured thin catalytic layer made from perylene red on a polyimide carrying substrate was chosen as a specific example. But in the case of other material sets, the carrying substrate would be different from the polyimide (e.g., silicon), and the nanostructured support elements could be different from the perylene red (e.g., carbon nanotubes).

Figure 1A:
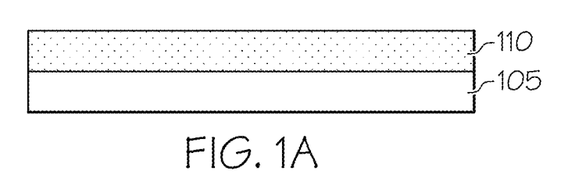
FIGS. 1A-D are an illustration of a general method of transferring a nanostructured thin catalytic layer electrode decal from a carrying substrate to a transfer substrate.

FIGS. 1A-D illustrate the general steps involved in transferring a nanostructured thin catalytic layer from a carrying substrate to a transfer substrate. FIG. 1A shows a transfer substrate 105 coated with an adhesive layer 110. The transfer substrate 105 can be any stiff or soft substrate. If the nanostructured thin catalytic layer is made on a smooth substrate, a stiffer substrate can be used as the transfer substrate. Stiff substrates can also be used if a thick layer of the temporary adhesive is coated on the transfer substrate, and the thickness of the adhesive layer is thicker than the roughness feature (e.g., corrugations) of the carrying substrate. For example, if the carrying substrate has a surface feature (e.g., corrugations) which is 6 microns between the highest and lowest points of the corrugated structure, then the thickness of the adhesive layer should be greater than 6 microns.

The transfer substrate can be porous or non-porous.

If a porous transfer substrate is used, the pores act as a drain for waste products used in further cleaning the nanostructured thin catalytic layer while keeping the nanostructured thin catalytic layer on the porous substrate. Soft porous substrates can accommodate the surface roughness of the carrying substrate if the nanostructured thin catalytic layers were not made on smooth substrates. Suitable types of porous substrates include, but not limited to, porous polyethylene (PE), porous polypropylene (PP), porous polyester, porous Nylon, porous polyimide (PI), expanded polytetrafluoroethylene (ePTFE), and porous siloxane.

One suitable porous substrate is expanded polytetrafluoroethylene (ePTFE). ePTFE is soft which allows it to receive the nanostructured thin catalytic layers from both the top and the bottom of the corrugations of the electrocatalyst decal on which they were grown. ePTFE has another advantage when an adhesive dissolved in a hydrophilic solution is used. Because ePTFE is hydrophobic, only a thin film of the adhesive, such as polyvinyl alcohol (PVA), is formed on the surface of the ePTFE when the adhesive is coated from a PVA water solution, and the PVA will not fill the pores of the ePTFE substrate.

Nonporous substrates can also be used. In this case, the nanostructured thin catalyst layer will typically be removed from the transfer substrate before further cleaning. Depending on the particular nanostructured material, an inexpensive, readily available commodity polymer can be used as the transfer substrate, which will make the process very cost-effective during high volume manufacturing. Examples of suitable nonporous substrates include, but are not limited to, PET, PEN, PP, PE, PS and PC.

The transfer substrate can be reused, if desired, making the process more cost effective.

The temporary adhesive layer 110 adheres the nanostructured thin catalytic layer and the transfer substrate together, allowing the removal of the nanostructured thin catalytic layer from its carrying substrate. Any suitable adhesive can be used. Desirably, the adhesive is easily removable, and does not poison the catalyst. Water soluble adhesives are desirable because they can be easily removed with water and water is the reaction product during fuel cell operations. However, other solvents can be used to remove the adhesive, if desired. Suitable adhesives include, but are not limited to, polyvinyl alcohol (PVA), polyethylene oxide, polyacrylate, polyethylene vinyl acetate, and soluble cellulose. One suitable adhesive is a water soluble PVA, for example, a water soluble PVA having a molecular weight (MW) of about 10,000. Generally, the PVA layer loading is between about 0.1 $mg/cm^2$ and about 10 $mg/cm^2$, or about 0.5 $mg/cm^2$ to about 2 $mg/cm^2$.

The transfer substrate can be either hydrophobic or hydrophilic. Preferably, an adhesive soluble in an aqueous or hydrophilic solution is applied when the porous transfer substrate is hydrophobic, or vice versa. This allows a thin film of the adhesive to form only on the surface of the porous transfer substrate. In this way, the pores are not filled with the adhesive initially.

Figure 1B:
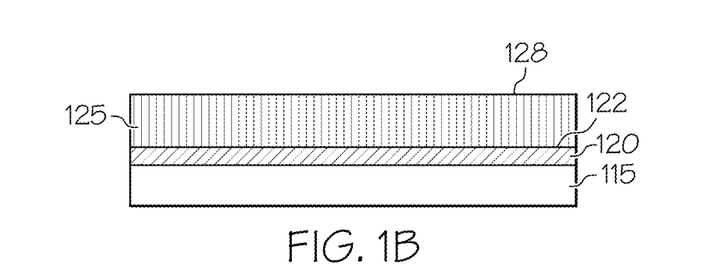

As shown in FIG. 1B, an electrocatalyst decal is provided. The electrocatalyst decal includes a carrying substrate 115 with nanostructured thin catalytic layer 125 on it. In some cases, there may be a residual layer 120 of the material used to form the nanostructured nanostructured catalyst elements between the carrying substrate 115 and the nanostructured thin catalytic layer 125. The nanostructured thin catalytic layer has a first surface 122 adjacent to the carrying substrate and an exposed second surface 128.

Suitable electrocatalyst decals comprising whiskers made from perylene red on a polyimide substrate known as NSTF catalyst layers are available from 3M. Other electrocatalyst decals with nanostructured thin catalytic layers could also be used. The nanostructured catalytic materials are either uniformly dispersed on the substrate or dispersed in a desired pattern. For example, aligned carbon nanotubes, aligned carbon nanofibers, or nanoparticles, and the like with uniformly dispersed catalyst could be used. Electrocatalyst decals incorporating such materials are described, for example, in Hatanaka et al., PEFC Electrodes Based on Vertically Oriented Carbon Nanotubes, $210^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Figure 1C:
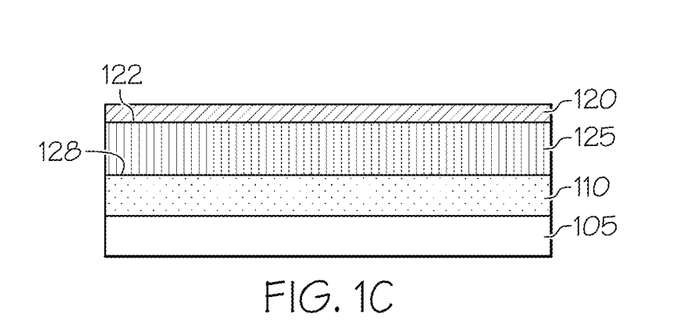

The nanostructured thin catalytic layer on the carrying substrate is inverted, and the second surface 128 of the nanostructured thin catalytic layer 125 is placed in contact with the adhesive layer 110 to form a composite structure. Suitable processes include, but are not limited to, static pressing with heat and pressure, or for continuous roll production, laminating, nip rolling, or calendering. The carrying substrate 115 is then removed (for example, by peeling off the carrying substrate). As shown in FIG. 1C, after the carrying substrate is removed, the residual layer 120 (if present) remains on the nanostructured catalytic layer 125.

Figure 1D:
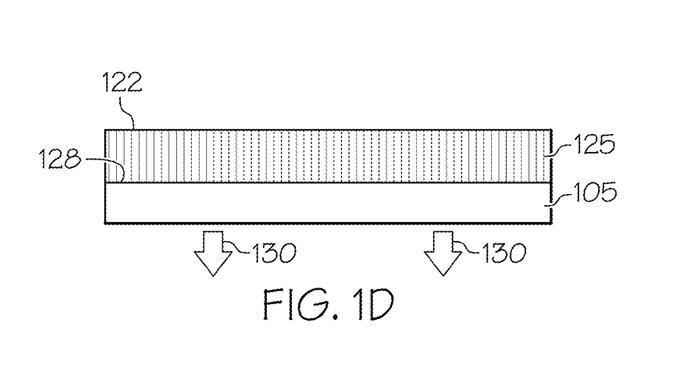

When a porous transfer substrate is used, the adhesive layer 110 can be then removed by a suitable process, as shown in FIG. 1D. One example of a suitable process involves rinsing the composite structure with a solvent to dissolve the adhesive. The solvent desirably wets the surface of the porous transfer substrate 105. Suitable solvents include, but are not limited to, water/alcohol mixtures, such as for example, a water/isopropanol (IPA) mixture when an ePTFE substrate is used. The alcohol in the water/alcohol mixture helps wet the hydrophobic ePTFE substrate, and the pores of the porous substrate act as a drain for the solvent.

The nanostructured thin catalytic layer 125 can be further treated to remove the residual layer 120 (if necessary), exposing the first surface 122 of the nanostructured thin catalytic layer 125. The residual layer 120 can be removed by any suitable process. One example of a suitable process is rinsing the nanostructured thin catalytic layer with a solvent to remove the residual layer. If the nanostructured thin catalytic layer comprises whiskers made from perylene red, suitable solvents for perylene red, include, but are not limited to, mixtures of water, acetone, n-propanol (NPA), or 1-methyl-2-pyrolidone (NMP). Water/NPA mixtures can dissolve small amounts of perylene red (low solubility). NMP appears to be very effective to dissolve perylene red, but it has a high boiling point and thus further solvent rinsing is required to fully remove it. Consequently, mixtures of the above mentioned solvents are preferred to perform the cleaning process. Again, the pores of the porous substrate act as a drain for the solvent and dissolved residual materials. If Fe or Ni catalysts are used to grow carbon nanotubes or carbon nanofibers, nitric acid, sulfuric acid, and other acids could be used to dissolve the residual metals. Alcohol could be added to the acidic solution to help wet the ePTFE substrate, if desired.

The adhesive layer 110 and residual layer 120 can be removed simultaneously by applying solvents for both layers at the same time. Alternatively, one layer can be removed after the other. In this situation, the adhesive layer 110 would preferably be removed first in order to clear up the path to the pores in the porous transfer substrate.

As shown in FIG. 1D, a vacuum 130 can be applied during the removal of the adhesive layer, and/or the removal of the residual layer, if desired.

If a nonporous transfer substrate is used, the nanostructured thin catalytic layer can be removed from the transfer substrate by dissolving the adhesive on the transfer substrate with a proper solvent. The residual layer can be removed later during the cleaning step. The nanostructured catalyst elements can be cleaned to remove the temporary adhesive by centrifuging, filtration, sonication, drying and redispersing, or combinations thereof with appropriate solvents.

Once the nanostructured catalyst elements have been cleaned, they are dispersed in an electrode ink, further containing ink solvent, ionomer, carbon and other particles, blended together using techniques such as ball milling, media milling, stifling, planetary milling and subsequently coated to form the electrode. Another approach would be to disperse only the nanostructured catalyst elements in a solvent using one of the methods discussed above, and in a separate step, predisperse carbon or Pt/C catalyst powder in the electrode solvent (and any other components) before the nanostructured catalyst elements are added. The advantage of this method is that different dispersing methods can be used for the two dispersions. The dispersions can be controlled and characterized separately in terms of solvent selection, ink rheology, and particle size distribution before they are blended together to form the final ink. This can yield potential improvement in coating quality, performance and durability of the final electrode.

The electrode ink can include one or more of ionomer; conductive particles, including but not limited to, carbon powder, and carbon fiber; catalyst; titanium dioxide; silica; nanofibers; nanotubes; or combinations thereof. For example, an ionomer can be added to increase the proton conduction of the catalyst under dry conditions. A hydrophobic component, such as PTFE particles, can be included to improve wet performance.

Conductive particles, such as carbon (powder, fibers, or both), or catalyst (typically the catalyst would be on a conventional carbon support) can be included to increase the overall electrode thickness and thus improve the product water storage capability.

More durable conductive particles can also be used to provide void space within the electrode for product water storage. Suitable compounds include, but are not limited to, conductive borides, carbides, nitrides, and silicides (B, C, N, Si). Suitable metals for the conductive particles include, but are not limited to Co, Cr, Mo, Ni, Ti, W, V, Zr. The use of such compounds, for example, TiN, is described in US Publication 2006/251954. One advantage of nanostructured thin catalytic layers over carbon supported electrodes is durability enhancement because the carbon support is susceptible to corrosion especially during fuel cell startup. These other conductive materials have not been fully suitable for electrode supports because they do not provide enough surface area, and consequently, Pt dispersion, as is obtainable with carbon. However, for the present use, the conductive particles would only need to function to provide void space and conductivity but not catalyst support, so the high surface area is not needed. Material durability is needed in the acidic and high electrochemical potential fuel cell environment. Thus, their use would be acceptable.

Titanium dioxide and/or silica, which are hydrophilic and could be used to retain product water under dry conditions, can also be included. The addition of non-conductive particles such as titanium dioxide or silica would likely require the addition of a conductive material to provide the electrical conductivity function. Ionomer could also be added to this layer or be pulled in by later coating processes to provide the needed protonic conductivity for this layer. Nanofibers and/or nanotubes, which can be used as structural materials to incorporate into the intermediate layer, can also be used.

The electrode ink containing the nanostructured catalyst elements made by the above process can then be used in conventional electrode and MEA fabrication methods. For example, the electrode ink can be coated on substrates including, but not limited to, electrode decals, proton exchange membranes, and diffusion media.

EXAMPLE 1

A water soluble PVA (molecular weight around 10,000) adhesive layer through a 5 wt % aqueous solution was coated on an ePTFE porous substrate. The PVA loading is about 0.6 mg/cm$^2$ after drying.

A 3M NSTF catalyst layer (0.15 mg Pt/cm$^2$) supported on a carrying substrate was provided. It included a polyimide carrying substrate, and a nanostructured thin catalytic layer of whiskers made from perylene red. There was a residual layer of perylene red on the interface between the whiskers and the polyimide carrying substrate. Using a hot press (105° C., 3.5 MPa, 4 minutes) process, the second surface of the layer of whiskers was pressed against the PVA adhesive layer on the ePTFE porous transfer substrate. The carrying substrate was then peeled off, leaving whisker layer on the porous transfer substrate and the residual layer of perylene red exposed.

Figure 2A:
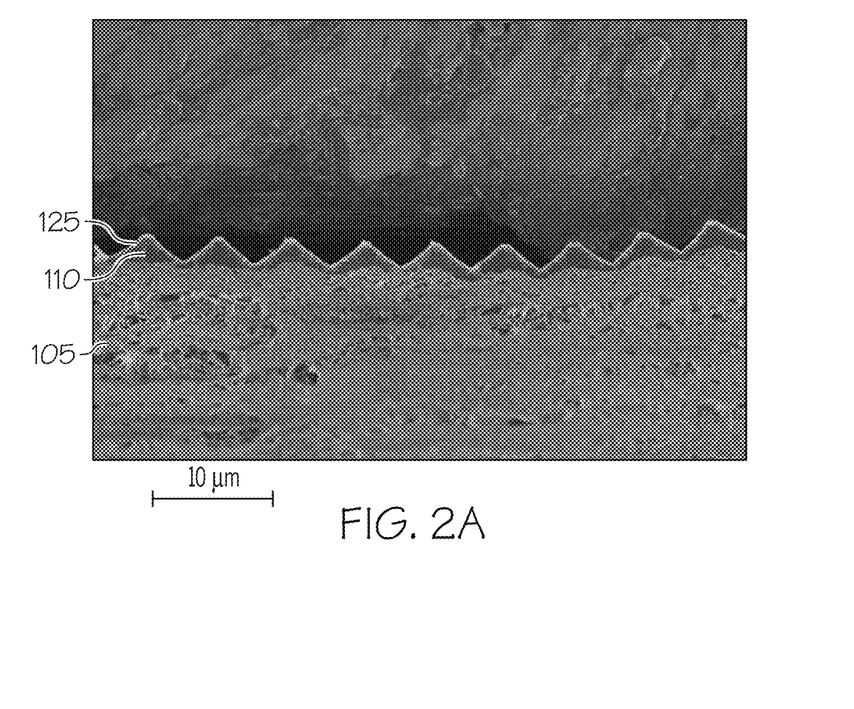
FIGS. 2A-B are SEM cross-section images of the transferred nanostructured thin catalytic layer on a porous transfer substrate of FIG. 1C.
Figure 2B:
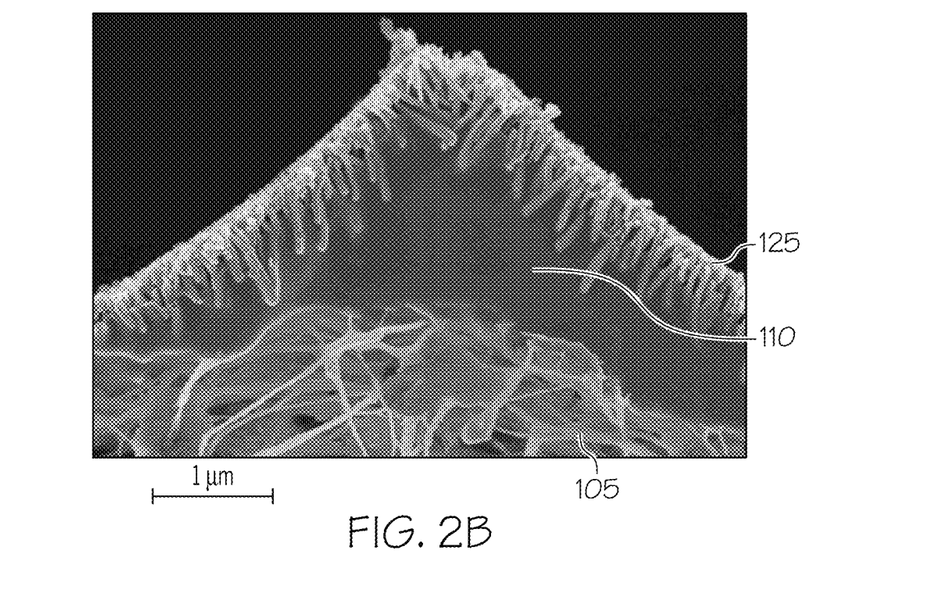

FIGS. 2A-B show SEM images of the 3M NSTF catalyst layer 125 (0.15 mg Pt/cm$^2$) transferred to the ePTFE transfer substrate 105 using the PVA adhesive 110.

The NSTF catalyst layer was then cleaned by washing the layer with a water/IPA (1:1 weight ratio) mixture solution multiple times until the solvent drained freely through the ePTFE substrate. An EtOH/NPA (1:1) mixture solution was then coated on top of the whiskers multiple times to remove the residual layer of perylene red, exposing first surface.

After the NSTF catalyst layer had been cleaned, the nanostructured catalyst elements were rinsed off the ePTFE substrate by washing with water.

EXAMPLE 2

A water soluble PVA (molecular weight around 10,000) adhesive layer through a 15 wt % aqueous solution was coated on a polyimide nonporous substrate The PVA loading is about 1.2 mg/cm$^2$ after drying.

A 3M NSTF catalyst layer supported on a carrying substrate was provided. It included a polyimide carrying substrate, and a nanostructured thin catalytic layer of whiskers made from perylene red. There was a residual layer of perylene red on the interface between the whiskers and the polyimide carrying substrate. Using a hot press (105° C., 3.5 MPa, 4 minutes) process, the second surface of the layer of whiskers was pressed against the PVA adhesive layer on the polyimide nonporous transfer substrate. The carrying substrate was then peeled off, leaving whisker layer on the nonporous transfer substrate 105 and the residual layer of perylene red exposed.

Figure 3A:
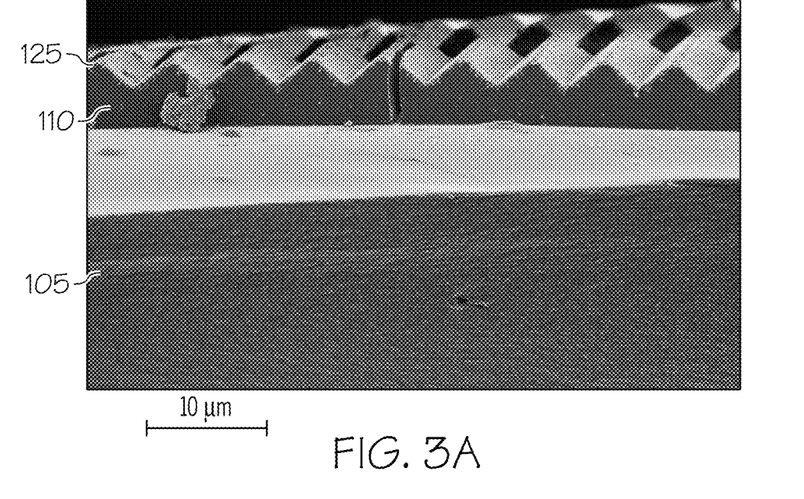
FIGS. 3A-B are SEM cross-section images of the transferred nanostructured thin catalytic layer on a nonporous transfer substrate of FIG. 1C.
Figure 3B:
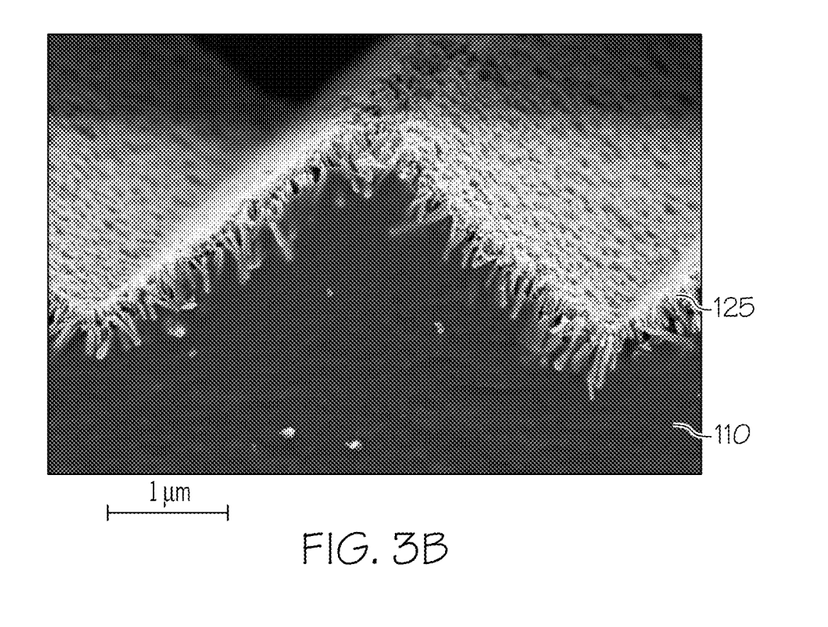

FIGS. 3A-B show SEM images of the 3M NSTF catalyst layer 125 transferred to the polyimide nonporous transfer substrate 105 using the PVA adhesive 110.

Figure 4A:
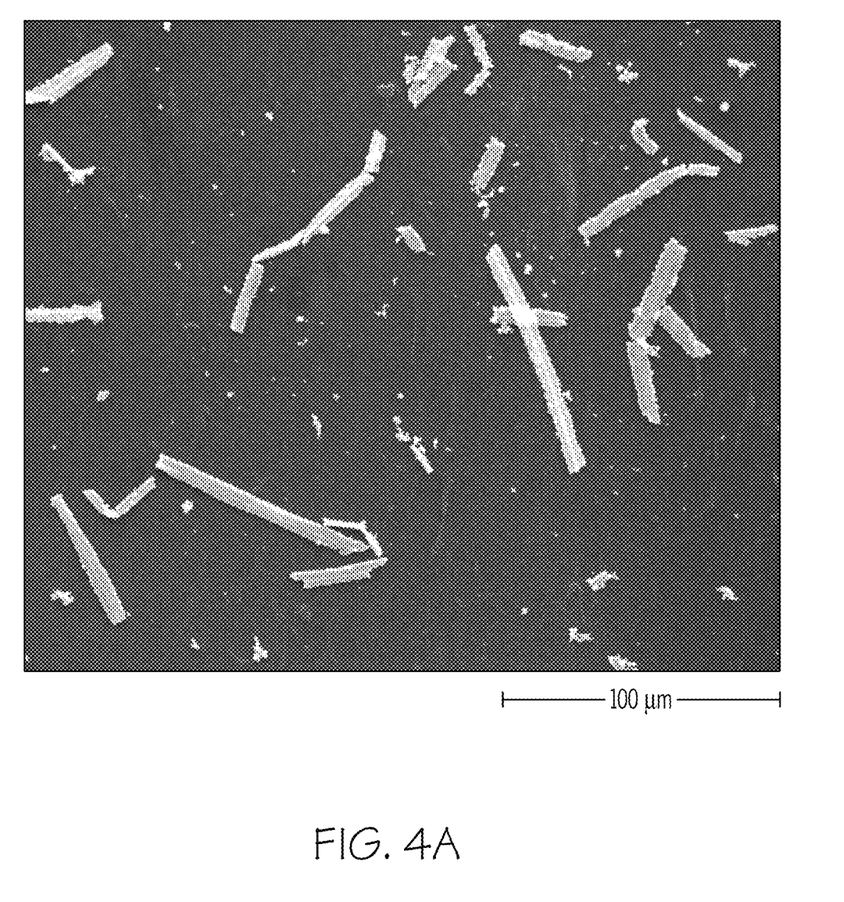
FIG. 4A is a micrograph of NSTF nanostructured catalyst elements after removal from the transfer substrate.
Figure 4B:
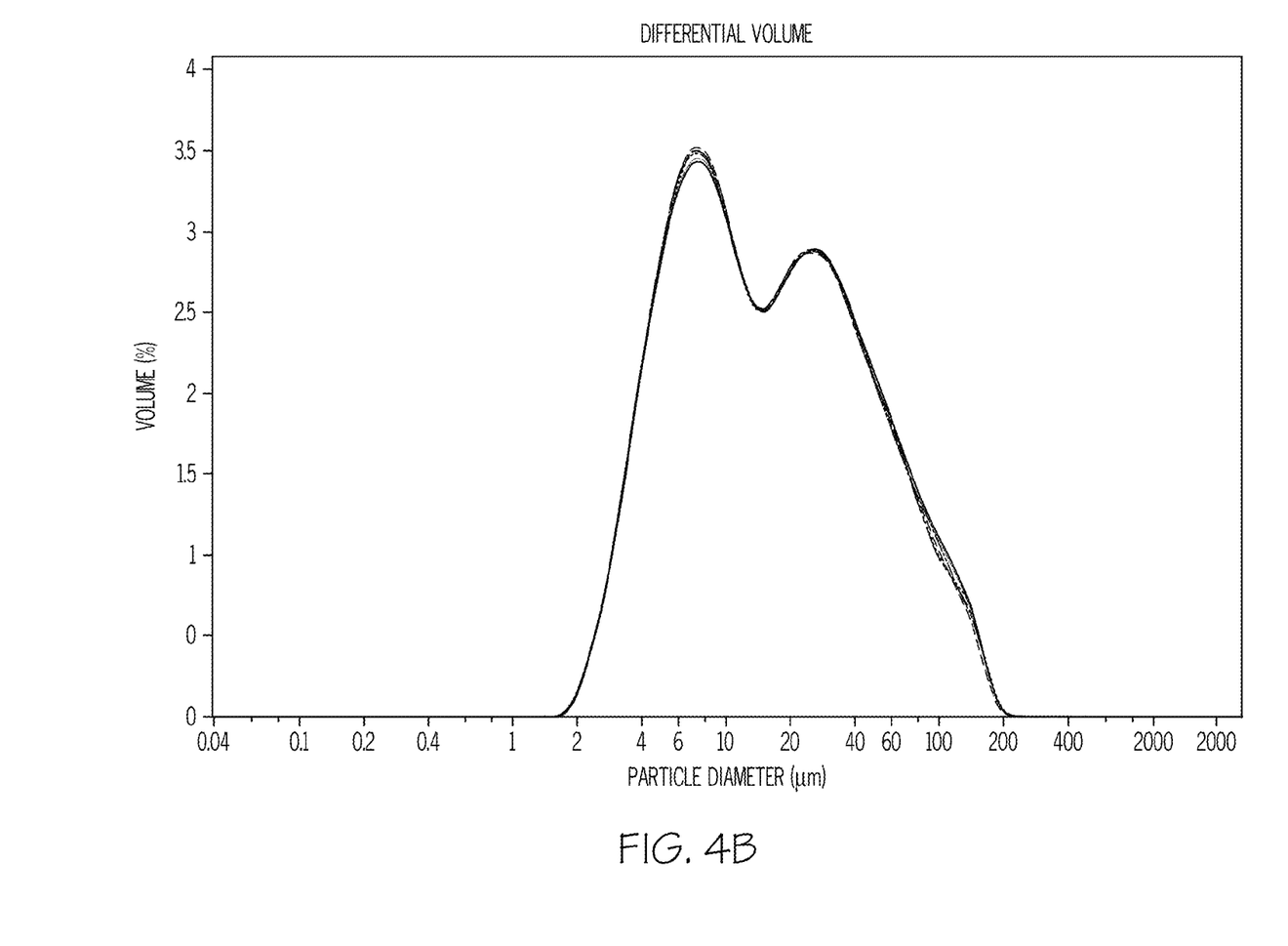
FIG. 4B is a graph showing the particle size distribution for the nanostructured catalyst elements.

The nanostructured catalyst elements were removed from the polyimide transfer substrate by rinsing with a water solution in a sonication bath. Clean up of the sample was accomplished in a two step process. In the first step, the nanostructured elements were vacuum filtered through a submicron sized filter. Subsequently, the nanostructured catalyst elements were centrifuged in a graduated centrifuge tube and the supernatant liquid was decanted. Clean water was then added to the tube which was sonicated to redisperse the nanostructured catalyst elements. FIG. 4A is a micrograph of the unsonicated nanostructured catalyst elements. FIG. 4B shows the particle size distribution of the unsonicated nanostructured catalyst elements. The NSTF nanostructured catalyst elements have mean particle diameter peaks centered around 6 µm and 30 µm.

Figure 5A:
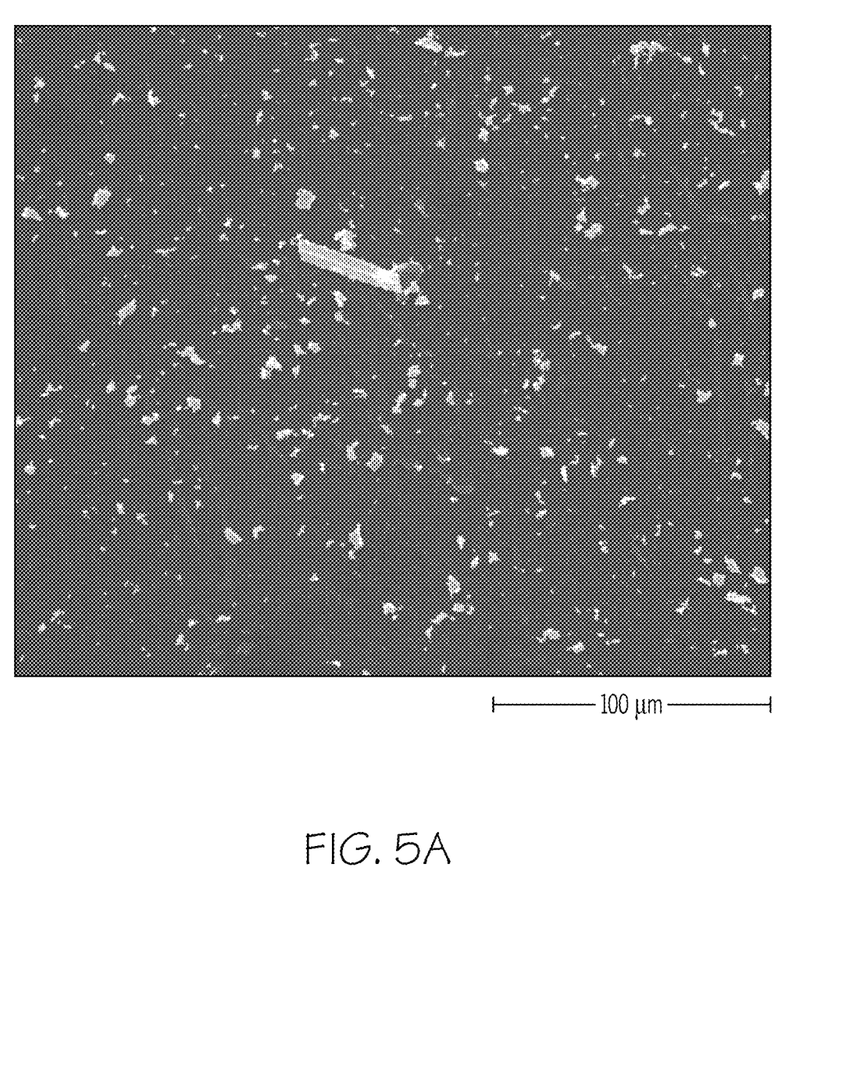
FIG. 5A is a micrograph of NSTF nanostructured catalyst elements after ultrasonication for 1 min.
Figure 5B:
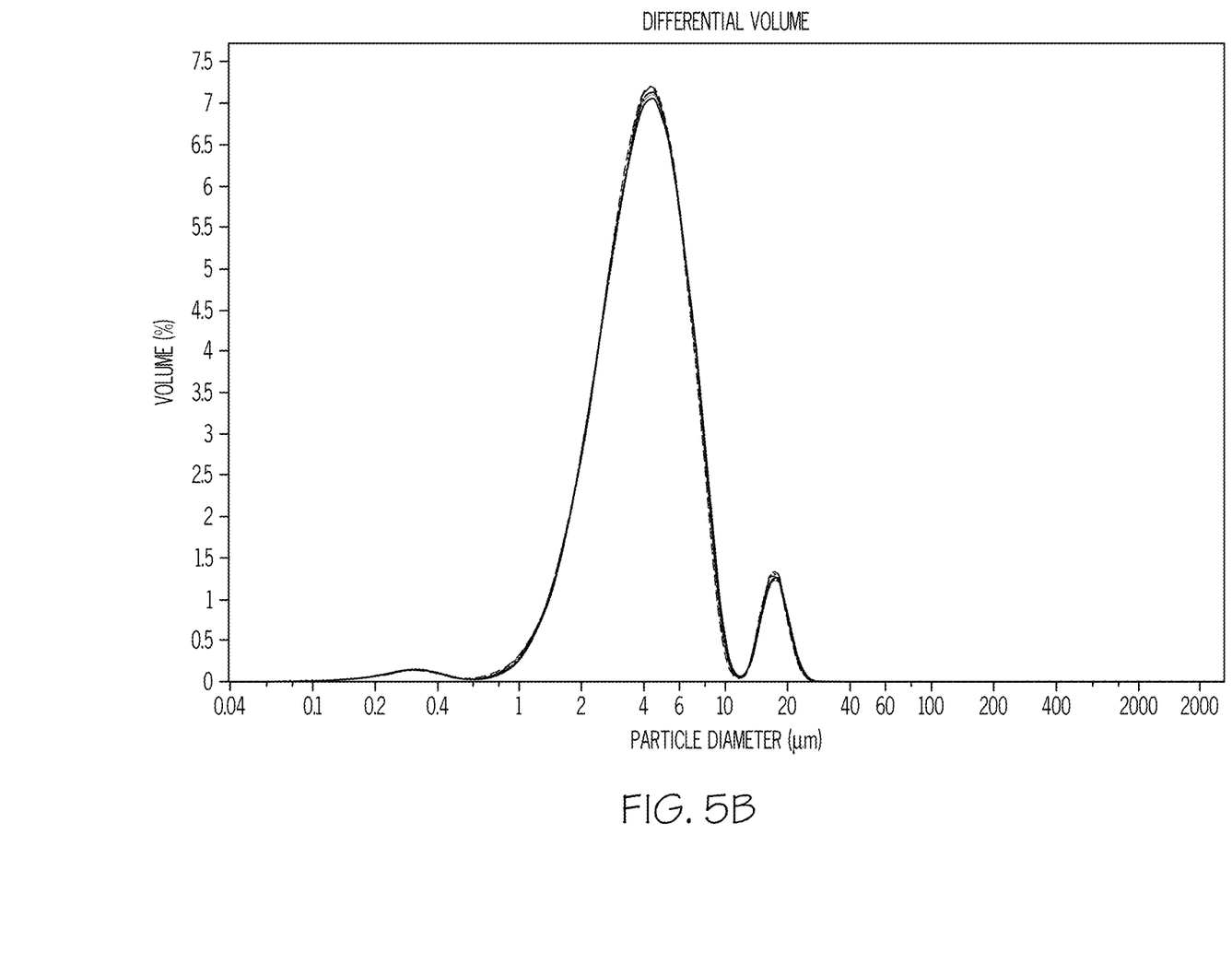
FIG. 5B is a graph showing the particle size distribution for the nanostructured catalyst elements after ultrasonication for 1 min.

FIG. 5A is a micrograph of the nanostructured catalyst elements after sonication for 1 min in water. FIG. 5B shows the particle size distribution of the nanostructured catalyst elements sonicated for 1 min. The NSTF nanostructured catalyst elements have begun to disintegrate into smaller clumps with mean particle diameter peaks centered around 4 µm and 18 µm.

Figure 6A:
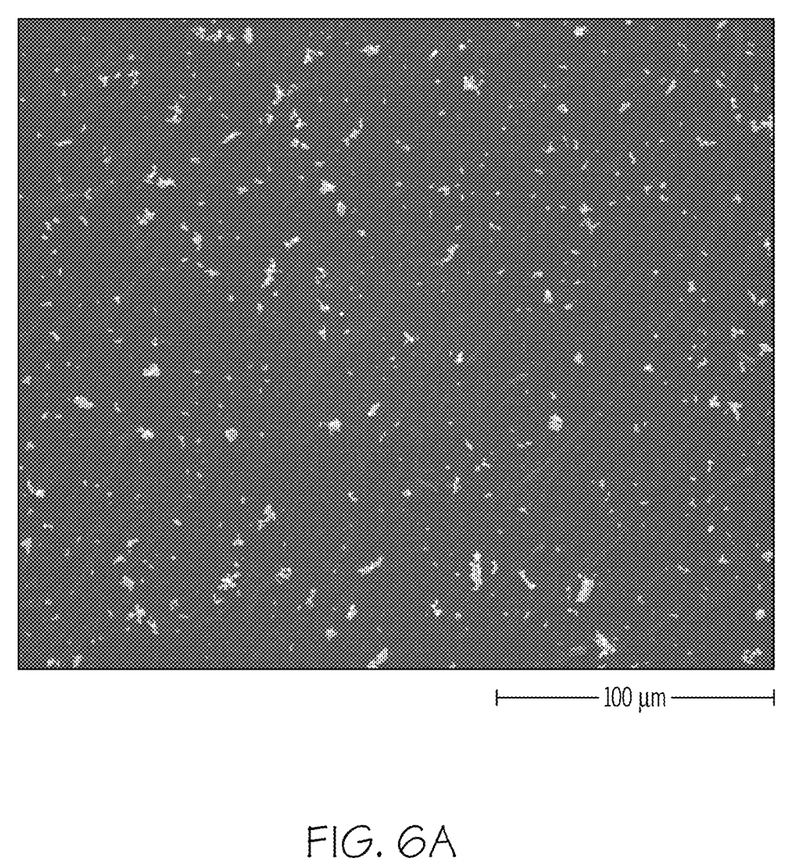
FIG. 6A is a micrograph of NSTF nanostructured catalyst elements after ultrasonication for 5 min.
Figure 6B:
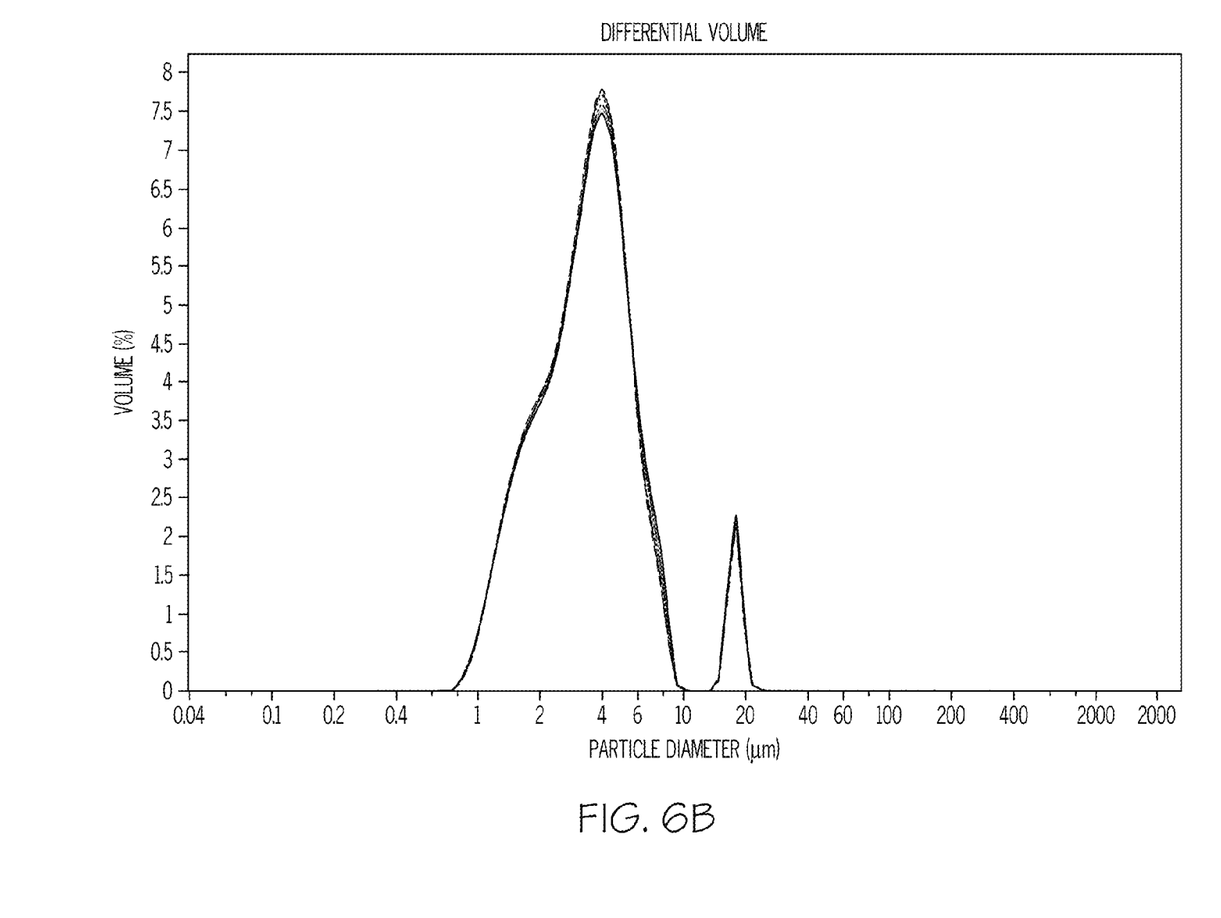
FIG. 6B is a graph showing the particle size distribution for the nanostructured catalyst elements after ultrasonication for 5 min.

After sonication for 5 min, more significant disintegration has occurred, as shown in FIGS. 6A-B. There are sharper peaks around 4 µm and 18 µm, and a shoulder at around 1.75 µm, which indicates the presence of smaller particles that can be uniformly dispersed.

EXAMPLE 3

The nanostructured catalyst elements were removed from the polyimide transfer substrate by rinsing with a water solution in a sonication bath as described above in Example 2 and dispersed using intense horn sonication at 20 W for 5 min.

An ink composed of Vulcan XC-72 carbon black, and DuPont Nafion® DE 2020 ionomer was premixed through ball milling process and was then blended together with the above dispersed nanostructured catalyst elements to prepare the final electrode ink. The weight ratio between the nanostructured catalyst elements and the Vulcan XC-72 carbon black was 0.25, and the ionomer to carbon weight ratio was 0.8 in the final electrode ink. An electrode decal was prepared by coating the electrode ink on an ETFE substrate using a meyer rod. The carbon black loading was 0.28 mg/cm$^2$, and the Pt loading was 0.07 mg/cm$^2$. After the electrode decal is dried, it was hot pressed to a DuPont Nafion® NRE211 membrane, and the ETFE decal was peeled off. The resulting MEA was characterized by SEM and tested for fuel cell performance on a test stand.

Figure 7A:
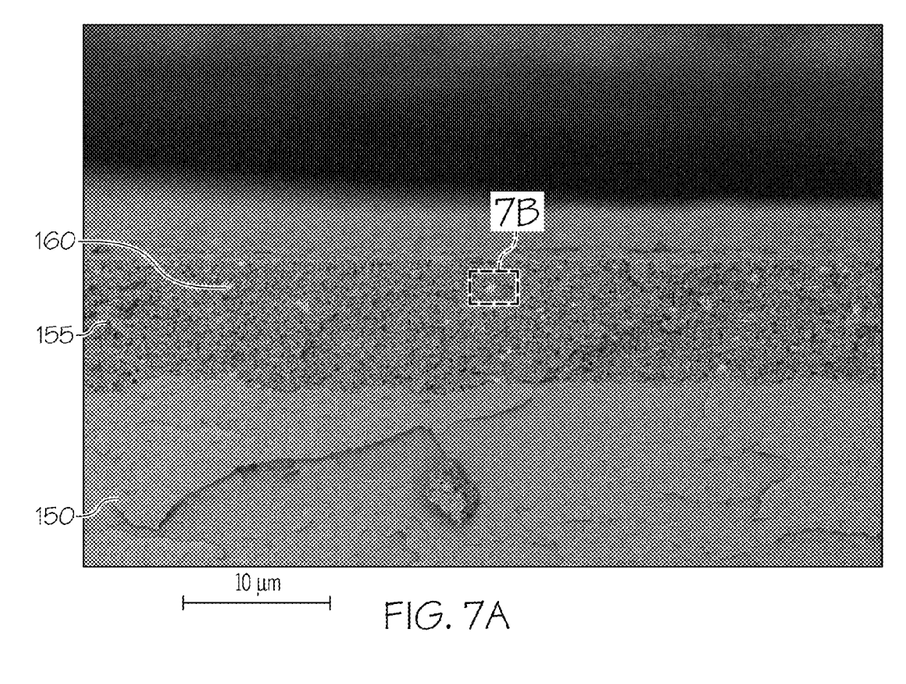
FIGS. 7A-B are SEM cross-section images of a MEA showing the proton exchange membrane and adjacent electrode prepared with an electrode ink containing nanostructured catalyst elements.
Figure 7B:
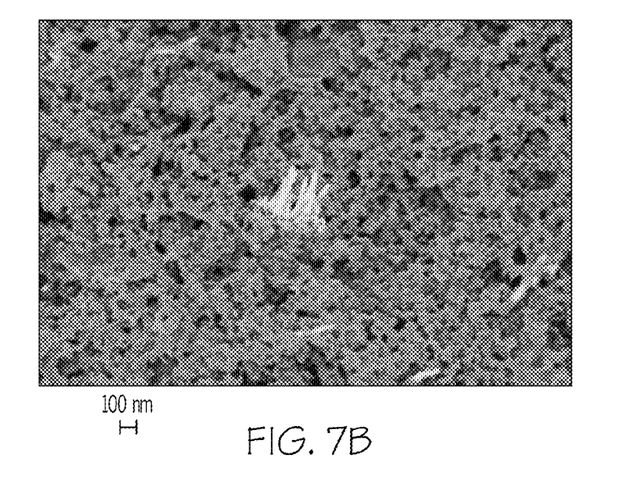

FIGS. 7A-B show the SEM cross section of the MEA discuss above. The nanostructured catalyst elements 160 were dispersed uniformly in the electrode layer 155. The electrode layer 155 was about 11 µm, which is significantly thicker that conventional NSTF electrodes (about 0.5 µm). This provides the electrode system with more water buffer capacity during wet operating conditions and high current density operations.

Figure 8:
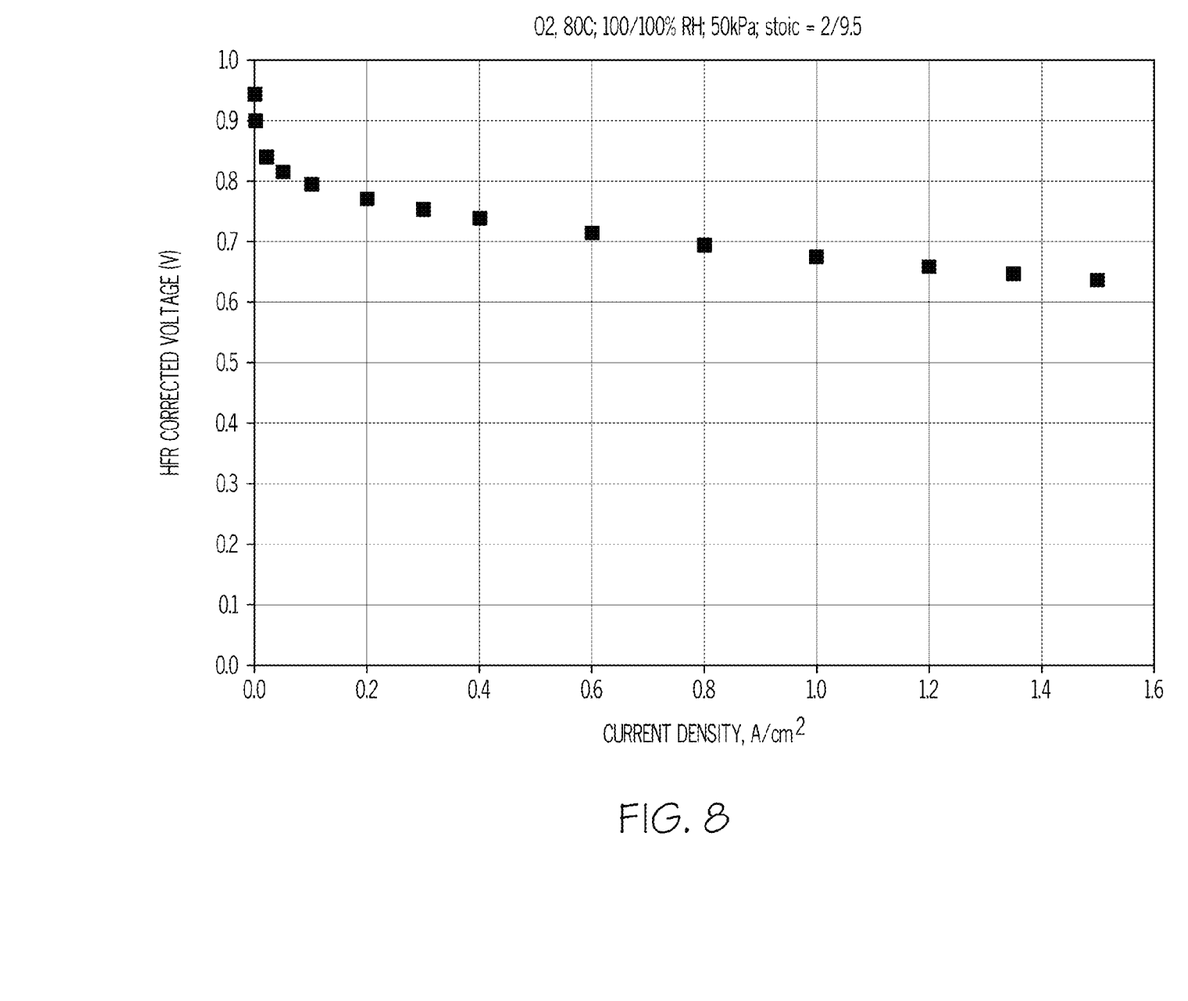
FIG. 8 is a graph showing the fuel cell performance of a membrane electrode assembly with nanostructured catalyst elements in the electrode as shown in FIG. 7.

FIG. 8 shows the fuel cell performance of the above MEA. It is plotted between high frequency resistance corrected voltage and hydrogen cross-over corrected current using hydrogen/pure oxygen as reactants (stoichiometric ratios of 2 and 9.5 respectively), at 80 C, 50 kPa gauge pressure, 100% RH. High frequency resistance (HFR) represents the fuel cell internal ohmic resistances, predominated by protonic resistance in the membrane and contact resistances of multiple interfaces. The Pt catalytic mass activity for this electrode containing redispersed nanostructured catalyst elements (the current density at 900 mV divided by the Pt loading) was estimated to be around 0.07 A/mg Pt. The electrochemically specific surface area from hydrogen adsorption/desorption measurement for this electrode was around 9 m$^2$/g Pt, and the Pt specific activity was determined to be around 800 µA/cm$^2$Pt. These results are comparable to that of the baseline NSTF catalysts hot pressed directly to a PFSA membrane. It indicates that this redispersed nanostructured catalyst elements electrode maintains the catalytic activity of the nanostructured thin film catalysts but would have a significantly larger water buffer capacity with the total electrode thickness being around 11 microns.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An electrode ink comprising:
   an electrode ink solvent; and
   nanostructured catalyst elements dispersed in the electrode ink solvent, the nanostructured catalyst elements produced by:
   transferring a nanostructured thin catalytic layer that includes the nanostructured catalyst elements from a carrying substrate to a transfer substrate;
   cleaning the nanostructured catalyst elements; and
   dispersing the cleaned nanostructured catalyst elements from the transfer substrate to the electrode ink solvent.

2. The electrode ink of claim 1 wherein the electrode ink solvent comprises water, isopropyl alcohol, ethanol, water/isopropyl alcohol, water/ethanol, or combinations thereof.

3. The electrode ink of claim 1 wherein the nanostructured catalyst elements are cleaned by washing the nanostructured catalyst elements with a solvent using filtration, centrifuging, drying and redispersing, or combinations thereof.

4. The electrode ink of claim 1 wherein the nanostructured catalyst elements are cleaned by sonicating the nanostructured catalyst elements.

5. The electrode ink of claim 1 wherein the nanostructured catalyst elements are cleaned before the nanostructured catalyst elements are dispersed from the transfer substrate.

6. The electrode ink of claim 1 wherein the nanostructured catalyst elements are cleaned after the nanostructured catalyst elements are dispersed from the transfer substrate.

7. The electrode ink of claim 1 wherein the nanostructured catalyst elements are dispersed in the electrode ink solvent using a process selected from ultrasonicating, ball milling, media milling, mechanical milling, or combinations thereof.

8. The electrode ink of claim 1 wherein the nanostructured catalyst elements dispersed in the electrode ink solvent comprising:
the nanostructured catalyst elements predispersed in a first electrode ink solvent;
at least one additional material is predispersed selected from ionomer, carbon powder, carbon fibers, or catalyst, titanium dioxide, silica, nanofibers, or nanotubes in a second electrode ink solvent; and
the predispersed nanostructured elements and the predispersed at least one additional material are blended together to form the electrode ink.

9. The electrode ink of claim 8 wherein the nanostructured catalyst elements are predispersed in the first electrode ink solvent using ultrasonicating, ball milling, media milling, mechanical milling, or combinations thereof.

10. The electrode ink of claim 8 wherein the at least one additional material is predispersed in the second electrode ink solvent using ball milling, media milling, planetary milling, ultrasonication, stirring or a combination thereof.

11. The electrode ink of claim 1 wherein at least one additional material selected from ionomer, conductive particles, carbon powder, carbon fibers, catalyst, titanium dioxide, silica, nanofibers, or nanotubes is dispersed in the electrode ink solvent with the nanostructured catalyst elements.

12. A coated substrate comprising:
a substrate selected from an electrode decal, a proton exchange membrane, or a diffusion media; and
an electrode ink coated on the substrate, the electrode ink comprising nanostructured catalyst elements dispersed in an electrode ink solvent, the nanostructured catalyst elements produced by:
transferring a nanostructured thin catalytic layer that includes the nanostructured catalyst elements from a carrying substrate to a transfer substrate;
cleaning the nanostructured catalyst elements; and
dispersing the cleaned nanostructured catalyst elements from the transfer substrate to the electrode ink solvent.

13. The coated substrate of claim 12 wherein the electrode ink further comprises at least one of ionomer, carbon powder, carbon fibers, catalyst, titanium dioxide, silica, nanofibers, or nanotubes.

14. The coated substrate of claim 12 wherein the nanostructured catalyst elements are cleaned by washing the nanostructured catalyst elements with a solvent using filtration, centrifuging, drying and redispersing, or combinations thereof.

15. The coated substrate of claim 12 wherein the nanostructured catalyst elements are cleaned by sonicating the nanostructured catalyst elements.

16. A membrane electrode assembly comprising:
a proton exchange membrane;
a pair of gas diffusion media on opposite sides of the proton exchange membrane, the gas diffusion media having first and second sides, the first side facing the proton exchange member; and
a pair of electrode layers between the proton exchange membrane and the pair of gas diffusion media, at least one of the electrode layers formed by coating an electrode ink on the proton exchange membrane, or the first side of the pair of gas diffusion media, the electrode ink comprising nanostructured catalyst elements dispersed in an electrode ink solvent, the nanostructured catalyst elements produced by:
transferring a nanostructured thin catalytic layer that includes the nanostructured catalyst elements from a carrying substrate to a transfer substrate;
cleaning the nanostructured catalyst elements; and
dispersing the cleaned nanostructured catalyst elements from the transfer substrate to the electrode ink solvent.

17. The membrane electrode assembly of claim 16 wherein at least one additional material selected from ionomer, conductive particles, carbon powder, carbon fibers, catalyst, titanium dioxide, silica, nanofibers, or nanotubes is dispersed in the electrode ink solvent with the nanostructured catalyst elements.

18. The membrane electrode assembly of claim 16 wherein the nanostructured catalyst elements are cleaned by washing the nanostructured catalyst elements with a solvent using filtration, centrifuging, drying and redispersing, or combinations thereof.

19. The membrane electrode assembly of claim 16 wherein the nanostructured catalyst elements are cleaned by sonicating the nanostructured catalyst elements.

* * * * *